(12) United States Patent
Fultz et al.

(10) Patent No.: US 7,454,561 B1
(45) Date of Patent: Nov. 18, 2008

(54) METHOD FOR OPERATING DISK DRIVES IN A DATA STORAGE SYSTEM

(75) Inventors: Phillip Fultz, Clinton, MA (US); Ashok Tamilarasan, Framingham, MA (US); Michael Manning, Hopkinton, MA (US); Thomas Dibb, Rutland, MA (US)

(73) Assignee: EMC Corporation, Hopkinton, MA (US)

( * ) Notice: Subject to any disclaimer, the term of this patent is extended or adjusted under 35 U.S.C. 154(b) by 734 days.

(21) Appl. No.: 11/153,932

(22) Filed: Jun. 16, 2005

(51) Int. Cl.
*G06F 13/00* (2006.01)
(52) U.S. Cl. ..................... 711/112; 711/163; 711/166
(58) Field of Classification Search ............. 711/112, 711/163, 166
See application file for complete search history.

(56) References Cited

U.S. PATENT DOCUMENTS 6,256,748 B1 * 7/2001 Pinson ........................ 714/6

2001/0021217 A1 * 9/2001 Gunther et al. ............. 374/178

* cited by examiner

Primary Examiner—Reba I Elmore

(57) ABSTRACT

A system sets a disk access inhibitor flag whenever a disk drive is placed by the system in an inaccessible condition. The drive operates to set a bit therein when the drive has placed itself in a by-pass condition. During each polling event, the system determines: (1) whether the bit has been set; and (2) whether the disk access inhibitor flag has been set. If the bit has been set and such disk access inhibitor flag has been set, the system maintains the drive in the inaccessible condition; otherwise, the drive is accessible to the system. If, during a polling event, the bit has been set but that drive has not had a bit set during a relatively long period of time, the system maintains the drive accessible to the system unless the drive sets the bit during a subsequent predetermined wait period, after which the system sets the flagdisk access inhibitor flag and places the drive in the inaccessible condition.

2 Claims, 4 Drawing Sheets

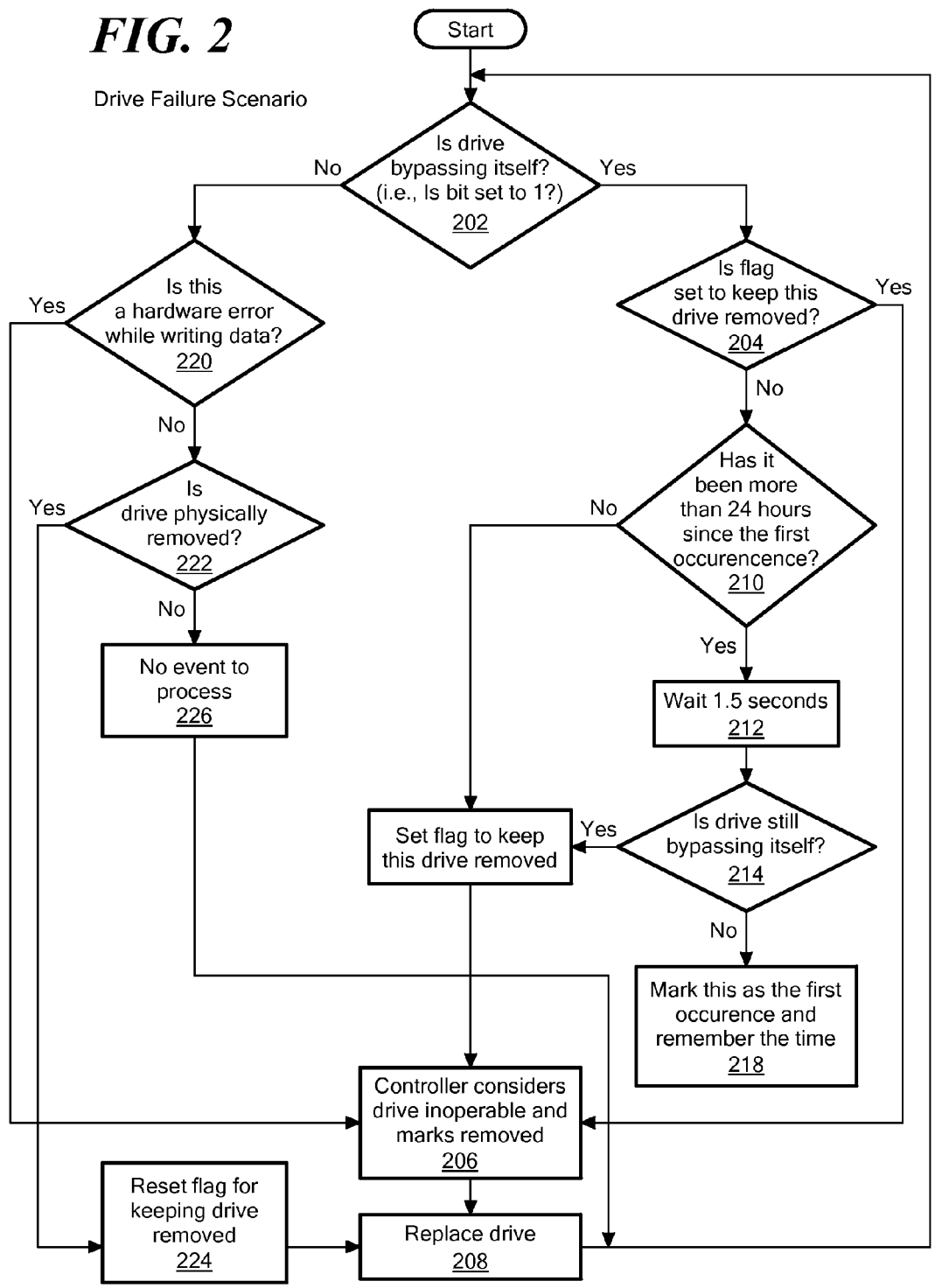

METHOD FOR OPERATING DISK DRIVES IN A DATA STORAGE SYSTEM

TECHNICAL FIELD

This invention relates generally to data storage systems and more particularly to methods for operating disk drives used therein. Still more particularly, the invention relates to methods for operating such system when disk drives therein randomly operate improperly, i.e., operate in a so-called "unstable" manner.

BACKGROUND

As is known in the art, large host computers and servers (collectively referred to herein as "host computer/servers") require large capacity data storage systems. These large computer/servers generally includes data processors, which perform many operations on data introduced to the host computer/server through peripherals including the data storage system. The results of these operations are output to peripherals, including the storage system.

One type of data storage system is a magnetic disk storage system. Here an array or bank of disk drives and the host computer/server are coupled together through a system interface. The interface includes "front end" or host computer/server controllers and "back-end" or disk controllers. The interface operates the controllers in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As is also known in the art, many disk drives used in data storage systems include, in addition to the magnetic storage device, include firmware/processor which monitors the performance and operation of the disk drive. If such firmware/processor detects a fault in such operation, it sets a bit in a register in the disk drive and takes such disk drive in a by-pass state for a short period of time, typically in the order of, for example, 200 milliseconds, thereby disabling it's access by the host computer. More particularly, the system interface includes a diagnostic section (which may be included within the controllers) which regularly polls (i.e., inspects) at a rate of typically 500 milliseconds, for example, the state of the bit register in each of the disk drives. In one system, whenever the diagnostic section detects that the bit register in a disk drive has been set, i.e., the disk drive is in a by-pass condition, such by-pass condition is reported to the system interface control section (i.e., the controllers) thereby advising the controllers to no longer access (i.e., write to or read data from), the by-passed disk drive. It is noted that the diagnostics, when it detects a by-pass condition, i.e., a set bit, does not know whether the by-pass is only temporary or permanent. That is, the diagnostics does not know whether the disk drive will have its by-pass condition removed and thereby again be operational. The polling continues and if the disk drive by-pass condition is removed, the system interface commences a rebuilding of data operation using error correction and detection codes (i.e., a data reconstruction operation). If during the rebuilding process, a new poll indicates that the disk drive is again in a by-pass condition, the system interface must again re-start the data rebuilding process. Further, once the disk drive is placed in a non-accessible condition, the system interface commences the rebuilding of data operation using error correction and detection codes and using a spare disk drive in the array or bank of disk drives, sometimes referred to as a "hot spare" disk drive, to immediately and automatically replace the by-passed disk drive. Thus, once a hot space switches into the system, the data reconstruction must be made using the hot spare before the data can be re-written from the hot spare back into the by-passed, and now perhaps physically replaced disk drive. This process can take from between 30 minutes to perhaps several days. Thus, the possibility of repeated response to by-pass condition bits by the disk drive reduced the efficiency of the data storage system and leaves the data vulnerable to data loss should a second fault occur.

SUMMARY

In accordance with the present invention, a method is provided for operating a system used to control access to and from a disk drive. The system sets a disk access inhibitor flag whenever the system places the disk drive in an inaccessible condition. In the absence of such disk access inhibitor flag, the disk drive is accessible to the system. The disk drive operates to set a bit therein when the drive has placed itself in a by-pass, or "down" condition. During each polling event, the system determines: (1) whether the bit has been set; and (2) whether the disk access inhibitor flag has been set. If the bit has been set and such disk access inhibitor flag has been set, the system maintains the drive in the inaccessible condition; otherwise, the drive is accessible to the system. If, during a polling event, the bit has been set but that drive has not had a bit set during a relatively long period of time, the system maintains the drive accessible to the system unless the drive sets the bit during a subsequent predetermined wait period, after which the system sets the disk access inhibitor flag and places the drive in the inaccessible condition.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is a flow diagram of the process in accordance with the invention; and

Like reference symbols in the various drawings indicate like elements.

DETAILED DESCRIPTION

Figure 1:
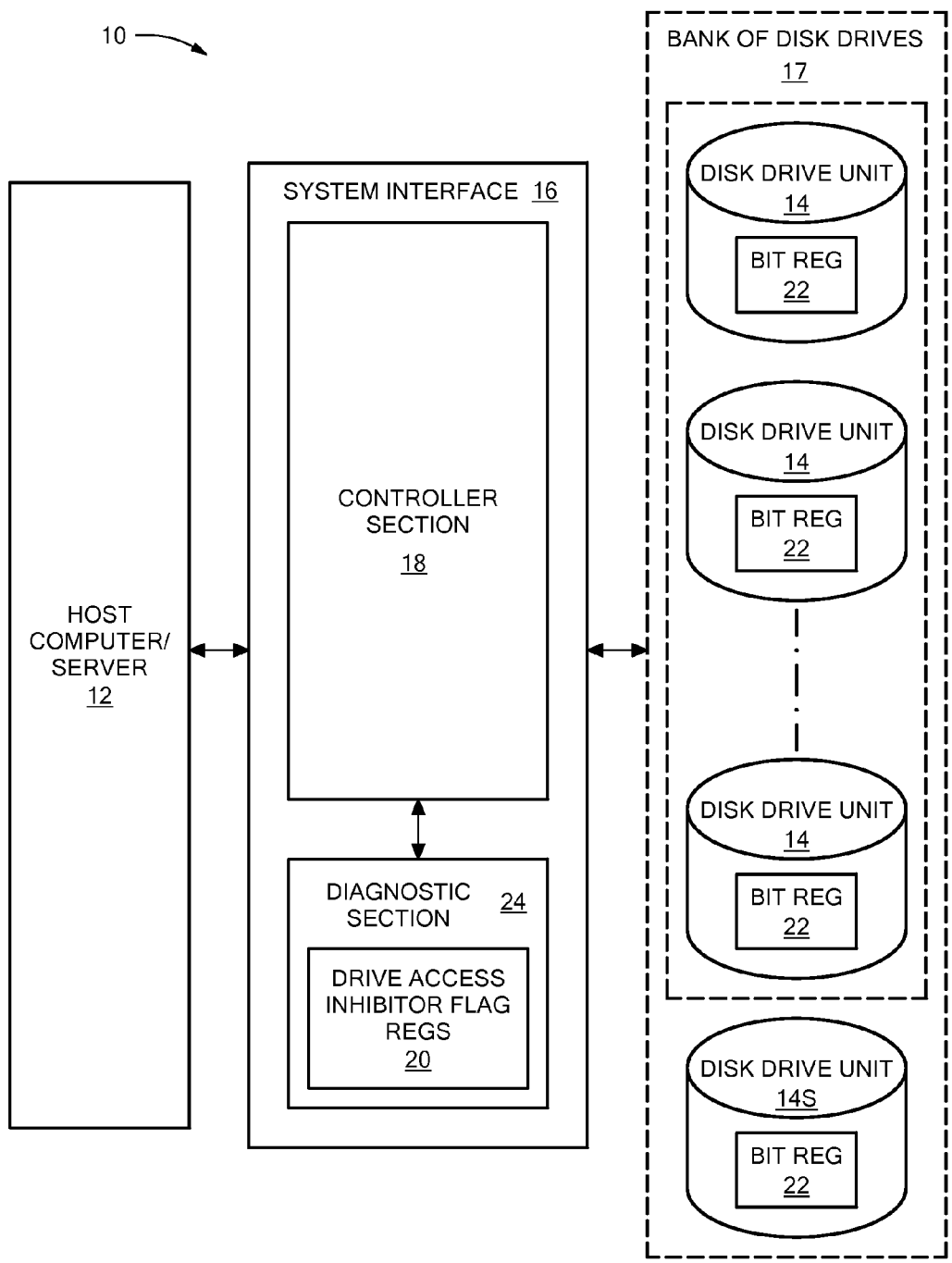
FIG. 1 is a block diagram of a system adapted to operate in accordance with the present invention.

Referring now to FIG. 1 a data storage system 10 is shown having a host computer/server 12 coupled to a bank or array of disk 14 drives through a system interface 16. The system interface includes a plurality of front-end controllers coupled to the host computer/server and back end directors coupled to the bank of disk drives in a controller section 18. A diagnostic section 20 is shown, it being noted that the diagnostic section 20 may be separate from the controller section 18 or may be distributed within the plurality of controllers. It is noted that one of the disk drives 14 in the bank 17 of disk drives 14 may be a hot spare disk drive 14S.

It is noted that each one of the disk drives 14 includes firmware/processor, not shown, for controlling the disk drive 14 in any conventional manner, it being noted that each disk drive includes a bit register 22 for storing a bit when such disk drive has been placed by the disk drive firmware/processor in a by-pass or down condition. In the absence of this bit, the disk drive 14 considers itself operational and available to the system interface 16. The diagnostic section 20 includes a register 24 for each one of the disk drives 14. Each one of the registers 24 is available to store a disk access inhibitor flag when the system interface 16 determines that the disk drive 14 corresponding to such register 24 is not available to the controllers in the system interface 16 for either storing data from the host computer/server 12 or for reading data from the disk drive 14 requested by the host computer/server 12. Thus, while the disk drives 14 themselves have there own firmware/processor for determining whether such disk drive 14 should be placed in a by-pass condition and hence in a "down" or inoperative condition, the system interface 16 may, in accordance with a process to be described in more detail in connection with FIG. 2, determine that a disk drive 14 should be inaccessible for use by the system 10. In such case, i.e., that the disk drive 14 should be placed in an inaccessible condition, the system interface 16 sets the disk access inhibitor flag in the diagnostic section 20 register 24 associated with such inaccessible disk drive 14.

Briefly, the system 10 sets the disk access inhibitor flag whenever a disk drive 14 is placed by the system 10 in an inaccessible condition. The disk drive 14 operates to set a bit therein when the disk drive 14 has placed itself in a by-pass condition. During each polling event, the system 10 determines: (1) whether the bit has been set; and (2) whether the disk access inhibitor flag has been set. If the bit has been set and such disk access inhibitor flag has been set, the system 10 maintains the disk drive 14 in the inaccessible condition; otherwise, the disk drive 14 is accessible to the system 10. If, during a polling event, the bit has been set but that disk drive 14 has not had a bit set during a relatively long period of time, the system 10 maintains the disk drive 14 accessible to the system 10 unless the disk drive 14 sets the bit during a subsequent predetermined wait period, after which the system sets the disk access inhibitor flag and places the disk drive in an inaccessible condition. This prevents a long rebuild and saves the customer data should a second drive in the group fail.

More particularly, the system 10 sets the disk access inhibitor flag in the register 24 of a corresponding disk drive 14 whenever the system 10 places such disk drive 14 in the inaccessible condition. In the absence of such disk access inhibitor flag, the disk drive 14 is accessible to the system 10. The disk drive 14 operates to set a bit in register 22 therein when the drive 14 has placed itself in a by-pass, or "down" condition. The system 10 continuously polls the disk drive 14 to determine, during each polling event: (1) whether the bit has been set, and generates a mark if the bit has been set together with a time of such poll event; and (2) whether the disk access inhibitor flag has been set. If the bit has been set and such disk access inhibitor flag has been set, the system 10 maintains the disk drive 14 in the inaccessible condition; otherwise, the disk drive 14 is accessible to the system 10. If, during a polling event, it is determined that the bit has been set but that the disk drive 14 has not had a bit set during a relatively long period of time, the system 10 does not immediately set the disk access inhibitor flag but rather maintains the disk drive 14 accessible to the system 10 unless the disk drive 14 sets the bit during a subsequent predetermined wait period, in which case the disk access inhibitor flag is set and the disk drive is placed in the inaccessible condition.

Referring now to FIG. 2, a more detailed flow diagram of the process is shown. As noted above, the diagnostic section 20 continuously polls each one of the disk drives 14; here the disk drives 14 are polled in parallel. Considering therefore one of the disk drives 14 and recognizing that the operation described below occurs concurrently for all disk drives 14, the diagnostic section 20 during each polling event, here once every 500 milliseconds, for example, determines whether such polled disk drive 14 has placed itself in a by-pass condition by reading the bit register 22 therein.

Thus, considering one of the polling events, the process determines whether the polled disk drive 14 has placed itself in a by-pass condition, Step 202, by determining whether the bit register 22 in such disk drive 14 has been set. If the bit is set, the process determines whether the disk access inhibitor flag in the register 24 of the diagnostic section 20 corresponding to the polled disk drive 14 has been set, Step 204. If the disk access inhibitor flag in register 24 has been set, the controllers in the controller section 18 are advised by the diagnostic section 20 not to send write data to such inaccessible disk drive 14 nor to try to read data from such inaccessible disk drive 14, Step 206. The condition is reported to a service technician who replaces the disk drive, Step 208, and the polling process repeats.

On the other hand, if in Step 204 the process determines that, in addition to having a set bit in the register 22 of the polled disk drive 14 (i.e., from Step 202), that the disk access inhibitor flag in the register 24 of the diagnostic system 20 corresponding to the polled disk drive 14 has not been set, the process determines from a time a mark is generated by the diagnostic section 20 in a manner to be described in connection with Step 218, whether a first predetermined period of time has passed, here for example, twenty-four hours, has passed since a prior poll in the polling indicated that this disk drive 14 had placed itself in the by-pass condition, Step 210. Thus, Step 210 is used to determine whether the there has been a relatively long time since the polled disk drive 14 has last placed itself in the by-pass condition.

If the first predetermined time has passed, i.e., a relatively long time has passed since the polled disk drive 14 has last placed itself in the by-pass condition, the process waits a second, shorter predetermined period of time to determine from the polling whether the drive 14 has placed itself in the by-pass condition, Step 212. That is, if the polled disk drive 14 has not placed itself in the by-pass condition for a relatively long period of time, as determined in Step 210, the process waits a shorter period of time, for example, here 1.5 seconds, to determine whether this disk drive 14 has placed itself in the by-pass condition, Step 212. It is noted that during this period of second, shorter period of time, the disk access inhibitor flag in the diagnostic section 20 is not set so that this disk drive 14 is still accessible by the system interface 16. It is recognized that if a read or write operation made by the system interface 16 to this by-passes disk drive 14 (such not having its access removed since the disk access inhibitor flag in register 24 corresponding to it has not been set), the system interface 16 will not receive an acknowledgement (ACK) indication from the disk drive 14 and hence the read or write operation will have to be repeated and will have to continue until a non-by-passed disk drive 14 is available. In any event, if the here 1.5 second period in Step 212 has passed and during the next subsequent poll of this disk drive 14 a bit is set in bit register 22 therein, the disk access inhibitor flag corresponding to this disk drive 14 is set in the diagnostics section 20, Step 216 and the process proceeds through Steps 206 and 208. Thus, in such case, the controllers in the controller section 18 of system interface 16 are advised not to send write data to such inaccessible disk drive 14 nor to try to read data from such inaccessible disk drive 14 and also the diagnostic section 20 generates the mark together with the time such mark is generated, Step 206. The condition is reported to a service technician who replaces the disk drive, Step 208, and the polling process repeats.

If, on the other hand, the process determines in Step 214 that the disk drive 14 is, after the 1.5 second period of time no longer by-passing itself, i.e., the polling indicated that the bit in such disk drive 14 is not set, the diagnostic section 20 generates the mark and records the time of such generated mark, Step 218, such mark indicating that this is the first time after the relatively long period of time that the disk drive 14 has placed itself in the by-pass condition and the polling process continues.

It is noted that if in Step 202 the process determines that the polled disk drive 14 has not placed itself in the by-pass condition, the process determines whether there is a hardware error while writing data. This is detected in any conventional manner by error detection and/or parity checks in the controller section 18 of the system interface 16, Step 220. If a hardware error is detected, the process proceeds to Steps 206 and 208, described above. On the other hand, if in Step 220 a hardware error is not detected, the diagnostic section 20 determines whether the disk drive 14 has been physically removed, Step 222. If the disk drive 14 has been physically removed, the disk access inhibitor flag in register 24 for this disk drive 14 is unset in the diagnostic section, Step 224 and the disk drive 14 is replaced as described in Step 208. On the other hand, if in Step 222 it is determined that the disk drive 14 has not been physically removed, the process continues in normal operation, Step 226.

Figure 3A:
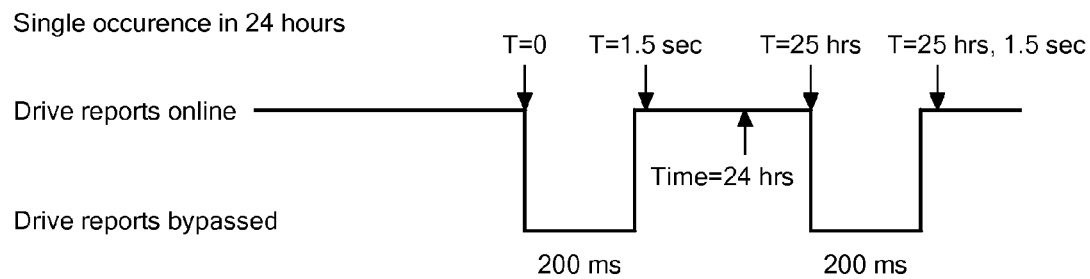
FIGS. 3A though FIG. 3D show various examples of the process having the flow diagram of FIG. 2.

Considering now several examples. Referring first to FIG. 3A, here, at time T=0, the drive 14 by-passing itself, Step 202, and the disk access inhibitor flag has not been set (Step 204). Since this is the first occurrence in a 24 hour period (Step 210), the process then waits, here 1.5 seconds, (Step 212) before determining if the drive should be removed (i.e., made inaccessible for use by the system). Thus, during this 1.5 second wait period the drive 14 remains accessible to the system 10. Here, in this example, at time T=1.5 seconds, the drive 14 is not by-passing itself, Step 214, and thus the drive 14 remains accessible to the system 10. The process also marks this event as having occurred, Step 218. Consequently, in this example, this process removes a data rebuilding process. At time T=25 hrs, the drive 14 is by-passing itself again. Since a relative long period of time has passed since the time of the last by-pass by the drive 14, here greater than 24 hours, Step (210), (i.e., this is greater then 24 hours since the first occurrence at time T=0), the process waits 1.5 seconds before determining if the drive should be removed (made inaccessible) or not, Step 212.). Thus, during this 1.5 second wait period the drive 14 remains accessible to the system 10. Here, in this example, at time T=25 hrs 1.5 sec, the drive is no longer by-passing itself, Step 214, and thus the drive 14 remains accessible to the system 10. The progress again marks this as the first occurrence, Step 218. Consequently, in this example, this process removes a data rebuilding process.

Figure 3B:
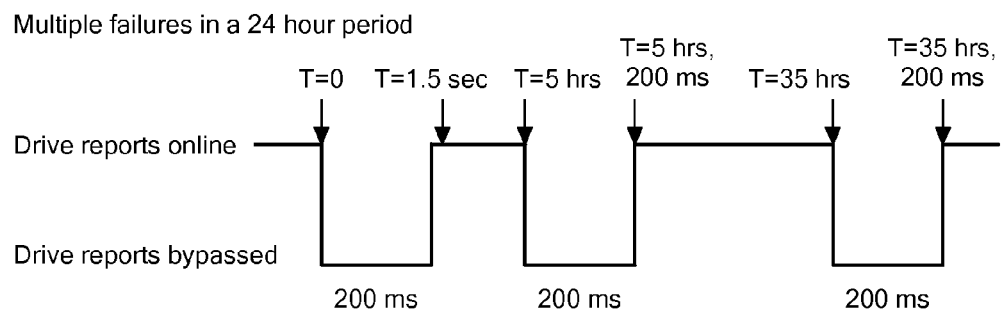

Referring now to FIG. 3B, here, in this example, at time T=0 the drive 14 is by-passing itself, Step 202, and the disk access inhibitor flag has not been set (Step 204). Since this is the first occurrence in a 24 hour period, the process waits 1.5 seconds before determining if the drive should be removed or not, Steps 210, 212, 214, and thus the drive 14 remains accessible to the system 10. The process marks this event as the first occurrence, Step 218. At time T=5 hours, the drive 14 is by-passing itself. At time T=5 hours, the drive 14 is by-passing itself, Step 214. Since this is the second occurrence in less then 24 hours, the diagnostic section 30 sets the disk access inhibitor flag in register 24, Step 216, advising the controllers in controller section 18 so that such controllers place the drive 14 in an inaccessible condition, Step 206. At time T=5 hours plus 200 milliseconds, the drive 14 is not by-passing itself, Step 202. The disk access inhibitor flag to keep the drive removed had been set in Step 216, therefore the process ignores the fact that the drive 14 is not by-passing itself and the drive remains inaccessible since the disk access inhibitor flag in register 24 is set. At time T=35 hours, the drive is by-passing itself. Since the disk access inhibitor flag has been set for this drive, the process ignores this and the drive remains inaccessible. At time T=35 hours plus 200 milliseconds the drive 14 is not by-passing itself. Since this drive has its disk access inhibitor flag set, the process ignores this and the drive remains inaccessible. Note that the process has ignored all by-pass and un-bypass events after 5 hours. Only if the drive is physically removed from the system, does the process reset the disk access inhibitor flag that maintains this drive in the inaccessible condition, Step 224.

Figure 3C:
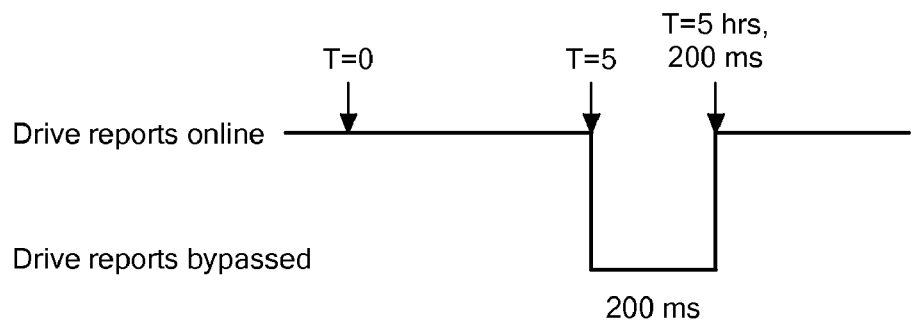

Referring now to FIG. 3C, here, in this example, at time T=0 a write operation to the drive 14 fails, i.e., a hardware failure, Step 220. This could be due to the drive media being faulty, for example. In such case, the process sets the disk access inhibitor flag to place this drive in the inaccessible condition, Step 206. At time T=5 hours, the drive places itself in a by-pass condition. Since this drive has had its disk access inhibitor flag set, the drive remains inaccessible. At time T=5 hrs plus 200 milliseconds, the drive is not by-passing itself. Since its disk access inhibitor flag has been set, the drive remains inaccessible even though it is not in a by-pass condition. This will prevent a faulty drive from storing customer data.

Figure 3D:
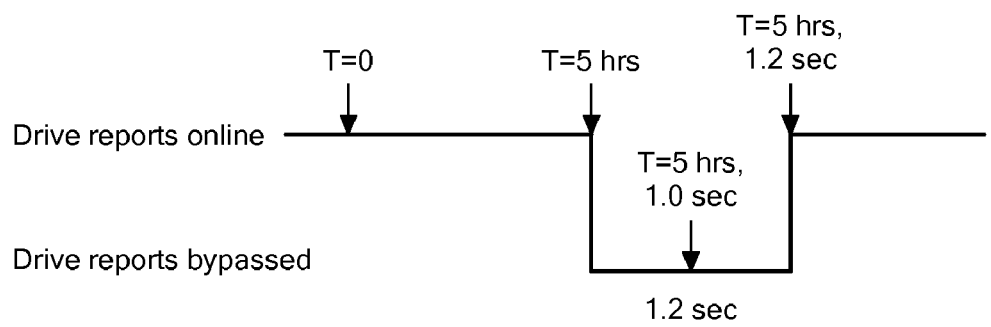

Referring now to FIG. 3D, in this example, at time T=5 hours, the drive has placed itself in a by-pass condition, Step 202, and the disk access inhibitor flag has not been set (Step 204). Since this is the first occurrence in a 24 hour period, Step 210, the process then waits 1.5 seconds, Step 214, before determining if the drive should be removed (i.e., placed in an inaccessible condition) or not, and thus the drive 14 remains accessible to the system 10. At time T=5 hours plus 1.0 sec, while the process waits the 1.5 seconds to determine whether the drive will be in a by-pass condition, here there are numerous hardware errors, Step 220, and therefore the process sets the disk access inhibitor flag for this drive Step 206. This places will the drive in the inaccessible condition and the 1.5 second delay is aborted, Steps 222 and 206. At time T=5 hours plus 1.2 seconds, the drive is not by-passing itself. However, the disk access inhibitor flag for this drive has been set, the drive remains in the inaccessible condition.

A number of embodiments of the invention have been described. Nevertheless, it will be understood that various modifications may be made without departing from the spirit and scope of the invention. Accordingly, other embodiments are within the scope of the following claims.

What is claimed is:

1. A method for operating a system used to control a disk drive, comprising:

setting a disk access inhibitor flag whenever the system places the disk drive in an inaccessible condition; in the absence of such disk access inhibitor flag, the disk drive being accessible to the system;

operating the disk drive to have such disk drive set a bit therein when the disk drive has placed itself in a by-pass; and wherein during each of a sequence of polling event, the system determines: (1) whether the bit has been set; and (2) whether the disk access inhibitor flag has been set, and wherein if the bit has been set and such disk access inhibitor flag has been set, the system maintains the disk drive in the inaccessible condition; otherwise, the disk drive is accessible to the system; and wherein if, during a polling event, the bit has been set but that disk drive has not had a bit set during a relatively long period of time, maintains the disk drive accessible to the system unless the disk drive sets the bit during a subsequent predetermined wait period, after which the system sets the disk access inhibitor flag and places the disk drive in the inaccessible condition.

2. A method for operating a disk drive in a data storage system, comprising:

continuously polling the disk drive to determine whether such disk drive has placed itself in a by-pass condition;

if during one poll of such polling a determination indicates such disk drive has placed itself in a by-pass condition, determining whether a disk access inhibitor flag has been set, such set disk access inhibitor flag operating to place the disk drive in an inaccessible condition, and:

if such disk access inhibitor flag has been set, placing the disk drive in an inaccessible condition for use by the system interface; otherwise, determining from a mark whether a first predetermined period of time has passed since a prior poll in the polling indicated that the disk drive had placed itself in the by-pass condition; and if the first predetermined time has passed, waiting a second, shorter predetermined period of time to determine from the polling whether the drive has placed itself in the by-pass condition; and if the disk drive has placed itself in the by-pass condition, setting the disk access inhibitor flag to maintain the disk drive in the inaccessible condition; otherwise, generating the mark to indicate a first occurrence of the by-pass condition and recording a time of such mark generation.

* * * * *